(12) United States Patent
Michaeli et al.

(10) Patent No.: US 11,485,458 B2
(45) Date of Patent: Nov. 1, 2022

(54) VARIABLE DISPLACEMENT LANDING CRAFT

(71) Applicant: Ockerman Automation Consulting, Inc., Anacortes, WA (US)

(72) Inventors: Jennifer Michaeli, Smithfield, VA (US); Robert Walling, Pine Beach, NJ (US); Alden Nelson, Norfolk, VA (US)

(73) Assignee: Ockerman Automation Consulting, Inc., Anacortes, WA (US)

( * ) Notice: Subject to any disclaimer, the term of this patent is extended or adjusted under 35 U.S.C. 154(b) by 344 days.

(21) Appl. No.: 16/826,044

(22) Filed: Mar. 20, 2020

(65) Prior Publication Data

US 2021/0291941 A1    Sep. 23, 2021

(51) Int. Cl.
| | | |
|---|---|---|
| *B63B 35/00* | (2020.01) | |
| *B63B 1/10* | (2006.01) | |
| *B63B 3/00* | (2006.01) | |
| *B63B 1/14* | (2006.01) | |

(52) U.S. Cl.
CPC .............. *B63B 35/00* (2013.01); *B63B 1/107* (2013.01); *B63B 3/00* (2013.01); *B63B 2001/145* (2013.01); *B63B 2035/001* (2013.01)

(58) Field of Classification Search
CPC ........... B63B 35/00; B63B 3/00; B63B 1/107; B63B 2001/145; B63B 2035/001
See application file for complete search history.

(56) References Cited

U.S. PATENT DOCUMENTS

| | | | | |
|---|---|---|---|---|
| 3,483,838 A | * | 12/1969 | Rath ....................... | B63H 25/42 114/260 |
| 3,591,023 A | | 7/1971 | Allen | |
| 4,528,927 A | * | 7/1985 | Iizuka ..................... | B63B 39/03 114/345 |
| 5,129,343 A | * | 7/1992 | Giles ...................... | B63H 23/12 114/271 |
| 5,215,025 A | * | 6/1993 | Talmor .................... | B63B 43/06 114/271 |
| 8,857,364 B2 | * | 10/2014 | Viviani ................... | B63B 43/06 114/288 |
| 2019/0118907 A1 | * | 4/2019 | Larson .................... | B63B 34/70 |
| 2021/0291938 A1 | * | 9/2021 | Michaeli ............... | B63B 27/143 |
| 2021/0291941 A1 | * | 9/2021 | Michaeli ................. | B63B 1/08 |

OTHER PUBLICATIONS

International Search Report and Written Opinion for PCT Application No. PCT/US2021/023214, dated Jun. 8, 2021.

* cited by examiner

*Primary Examiner* — S. Joseph Morano
*Assistant Examiner* — Jovon E Hayes
(74) *Attorney, Agent, or Firm* — Dorsey & Whitney LLP

(57) ABSTRACT

A watercraft according to the present disclosure may include an outer hull that defines an interior or hull cavity, and a ballast system located within the hull cavity. The ballast system may include at least three ballast tanks longitudinally distributed along the hull cavity, and each of the tanks being configured to be independently operated enabling selective entrapment of ballast at three or more different longitudinal locations to enable an intentional shifting of the longitudinal center of gravity (LCG) of the watercraft relative to the design location of the LCG of the watercraft. The watercraft may include at least a forward, a center, and an aft ballast tank, and in some embodiments, additional tanks, in some cases in sponsons, may be included and/or one or more of the forward, center and aft tanks, may be further subdivided for additional active LCG control.

26 Claims, 5 Drawing Sheets

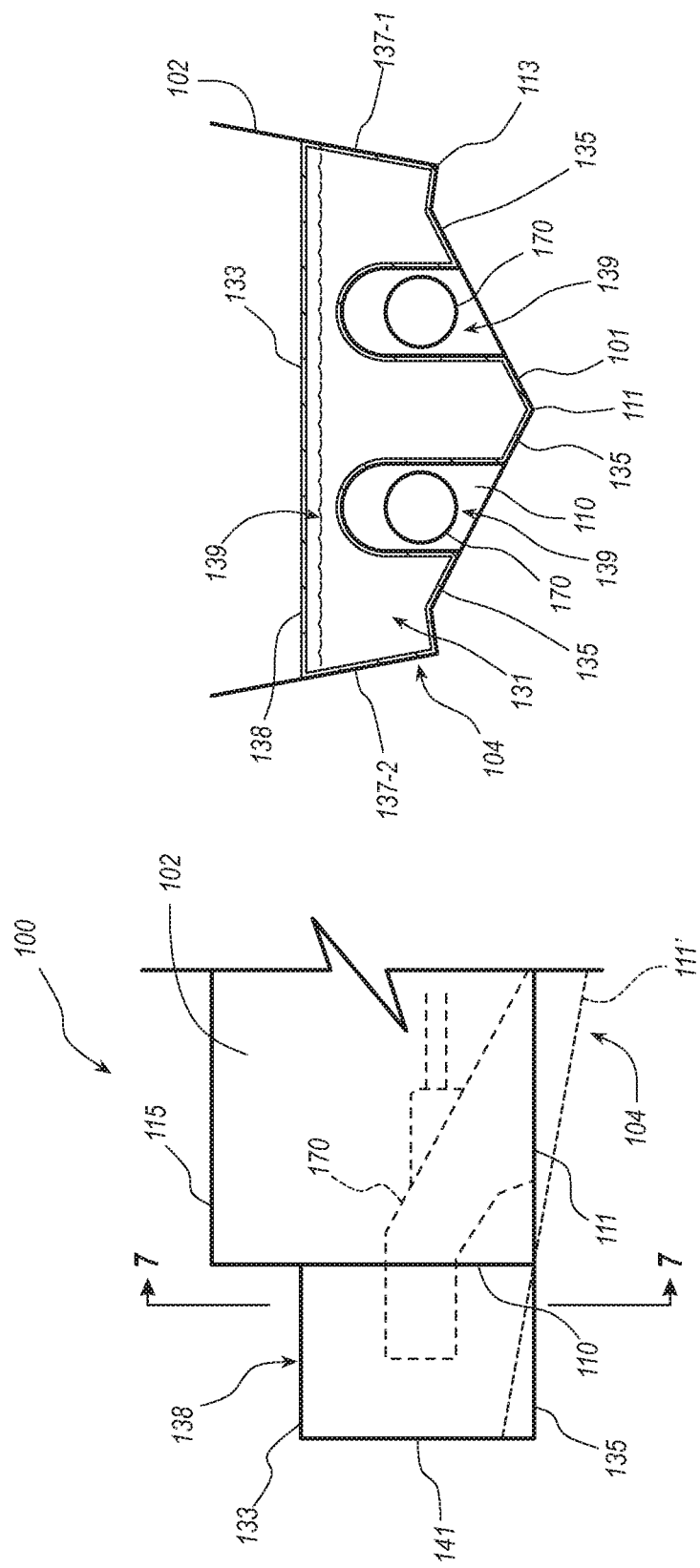

VARIABLE DISPLACEMENT LANDING CRAFT

FIELD

The present disclosure relates generally to a multi-functional watercraft, and more specifically a variable displacement landing craft with enhanced longitudinal center of gravity control for greater payload and functional capabilities.

BACKGROUND

A landing craft is a type of small to medium sized seagoing vessel capable of or designed specifically for a landing or beaching operations. A landing or beaching operation is an operation in which the boat is deliberately brought to and temporarily held in shallow water (i.e., at a beach or shoreline), which is done for the purpose of loading and/or unloading cargo (e.g., land vehicles, personnel or other cargo) directly onto land. A landing craft may be equipped with a ramp, which in existing craft of this type is located at the bow of the vessel. Existing landing craft are designed for bow-to beaching—that these craft are designed to approach a beach with the bow. This avoids bringing the stern of the vessel into shallow water, which may increase the risk for grounding the vessel and damaging the external propulsor (e.g., by entrapping the outboard portion of the propulsor or the stern portion of the hull into the shoreline).

A boat's center of gravity (CG) is the location or point through which all of the combined weight of the boat (including that of its structure and payload) is assumed to act vertically downwards. The CG's location is defined in relation to a reference point, typically a point located at the intersection of the front perpendicular (a line extending perpendicularly at the front of the bow) and the baseline (a line extending longitudinally from the bottom-most location of the hull). As such, the CG can be defined by its longitudinal (LCG), vertical (VCG) and transverse (TCG) components which are defined by the longitudinal, vertical and transverse distances to the reference point. The location of the boat's CG impacts, among other things, the stability of the vessel and thus careful attention is given to the design of the boat's hull and other structures and well as the operational restrictions on a boat (e.g., minimum water depth, maximum load capacity, locations of load compartment, max speed, etc.).

A variable displacement craft is a watercraft designed to intentionally increase its submersed volume (irrespective of its payload, e.g., cargo or personnel carried by the vessel), which may improve the vessel's stability such as by intentionally submerging a larger amount of its hull in the water and thus becoming less susceptible to rough weather. Such variable displacement vessel is described by Talmor in U.S. Pat. No. 5,215,025. While Talmor describes a boat that may be capable of selectively adjusting its displacement by using an internal ballast system, there remain unmet needs for performance and/or functional capabilities of vessels of this class. Therefore, designers and manufacturers of boats of this class continue to seek improvements thereto.

SUMMARY

A variable displacement watercraft according to one embodiment of the present disclosure includes an outer hull having interior surfaces that define a hull cavity, and a ballast system located within the hull cavity. The ballast system includes at least three ballast tanks longitudinally distributed along the hull cavity, and each of the three ballast tanks is configured to be independently filled with or emptied of a liquid thereby enabling selective entrapment of the liquid as ballast at three or more different longitudinal locations along a length of the hull to enable an intentional shifting of the longitudinal center of gravity (LCG) of the watercraft forward and aft of a design location of the LCG of the watercraft. In some embodiments, the at least three ballast tanks include a forward ballast tank located near the bow of the watercraft, an aft ballast tank located near the stern of the watercraft, and a center ballast tank positioned between the forward ballast tank and the aft ballast tank. In some embodiments, each of the at least three ballast tanks (e.g., the forward, center and aft tanks) may be further longitudinally subdivided, which may provide additional LCG control. For example, in some embodiments, the center ballast tank is divided into a plurality of center tank portions longitudinally distributed along the hull, wherein each of the plurality of center tank portions is operable to selectively entrap water at a different longitudinal location of the center ballast tank. Two or more of the at least three ballast tanks may be selectively fluidly connected to allow the moving of ballast fluid between tanks.

In some embodiments, the at least three ballast tanks are longitudinally distributed to allow for 12% or greater shift of the LCG forward and aft of the design location. In some embodiments, the at least three ballast tanks are longitudinally distributed to allow for up to about 20% aft and 25% forward shift of LCG from the design location. In some embodiments, the at least three ballast tanks are configured to enable up to 50% increase in displacement while tolerating a shift of the LCG of up to about 20% forward and up to about 15% aft of the design location. In some embodiments, the at least three ballast tanks are configured to enable up to 60% increase in displacement while tolerating a shift of the LCG of up to about 15% forward and up to about 13% aft of the design location. In some embodiments, the at least three ballast tanks are configured to enable up to 70% increase in displacement while tolerating a shift of the LCG of up to about 8% forward and up to about 10% aft of the design location. In some embodiments, the at least three ballast tanks are configured to enable up to 80% increase in displacement while tolerating a shift of the LCG of up to about 5% forward and up to about 9% aft of the design location.

In some embodiments, the watercraft may have a transom stern that includes a transom and the aft ballast tank may extend substantially to the transom. In some embodiments, the watercraft includes an engine room located near the stern of the watercraft and the aft ballast tank extends along at least a portion of a length of the engine room. In some such embodiments, the aft ballast tank of the watercraft may extend to a bulkhead forward of the engine room. In some embodiments, the aft ballast tank may have an irregular geometry in that at least a portion of the aft ballast tank surrounds at least a portion of the engine room. For example, the ballast tank may extend below and along both the port and starboard side of the engine room. The aft ballast tank may include respective side portions extending at least partially along the port and starboard sides of the engine room. The aft ballast tank may substantially fill the hull cavity near the stern of the boat which is not otherwise occupied by a functional area, such as the engine room. In some embodiments, the variable displacement watercraft includes a cargo compartment located forward of the engine room, and the forward ballast tank extends substantially from the bow to a bulkhead positioned forward of the cargo compartment.

In some embodiments, the variable displacement watercraft is a landing craft, which includes a ramp configured to extend from the stern of the watercraft toward a shoreline for loading or unloading cargo into the cargo compartment of the watercraft. In some embodiments, the ramp is retractable within the hull cavity. In some embodiments, the watercraft includes a transom sponson coupled to the transom and configured to be fluidly coupled to the ballast system to receive additional liquid as ballast for extending the capacity of the internal ballast system of the watercraft. The transom sponson may be removably attachable to the transom of the watercraft and may have outer surfaces that complement the shape of the hull, such as by extending the lines of the hull form beyond the transom of the boat. In some embodiments, the upper surface of the sponson may be substantially at the elevational level of the watercraft's sheer. In some embodiments, the upper surface of the sponson may be elevationally below the sheer, (e.g., between the sheer and a chine of the hull). In some embodiments, the transom sponson may have an irregular geometry having one or more longitudinally extending passages configured to accommodate an outboard portion of a respective propulsors and/or operation thereof.

BRIEF DESCRIPTION OF THE DRAWINGS

The description will be more fully understood with reference to the following figures in which components may not be drawn to scale, which are presented as various examples of the variable displacement landing craft described herein and should not be construed as a complete depiction of the scope thereof.

FIG. 6 is a side or profile view or a stern portion of the boat in FIG. 1 with a ballastable transom sponson in accordance with the present disclosure; and FIG. 7 is a section view of the stern of the boat in FIG. 1 taken at line 7-7 in FIG. 6.

DETAILED DESCRIPTION

Figure 1:
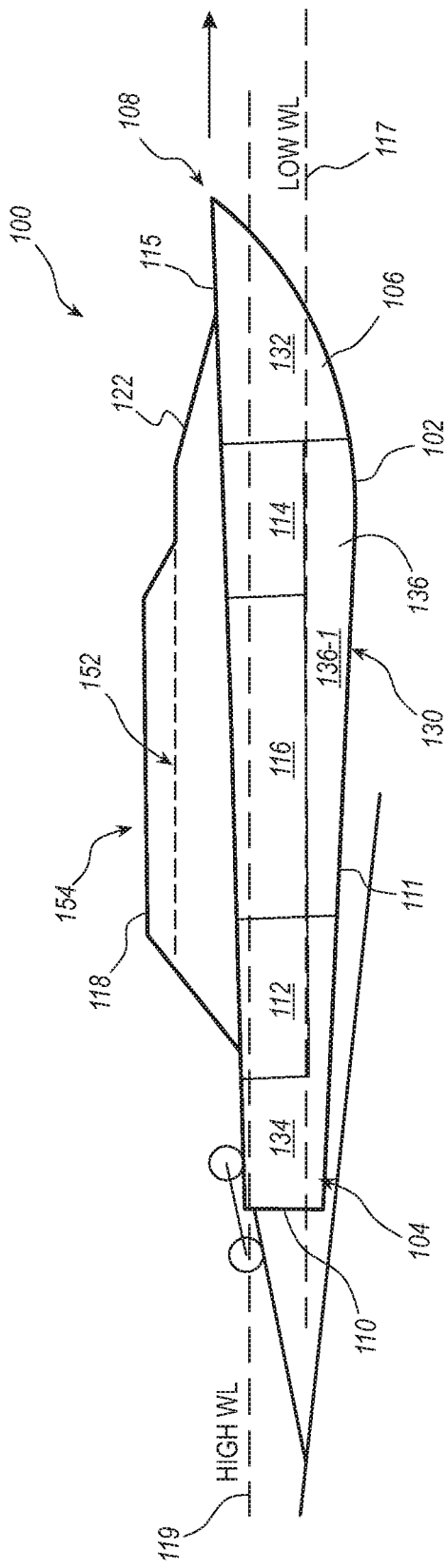
FIG. 1 is a simplified side or profile view of a boat according to the present disclosure.

The present disclosure pertains to a variable displacement landing craft. The variable displacement watercraft may have an enhanced active LCG control and may have a hull form, the stern portion of which may have variable deadrise, to facilitate stern-to beaching and optional other capabilities. The greater LCG control may provide for various advantages including the ability to accommodate a wider range of payloads on the vessel. The variable displacement watercraft may be equipped with a ballast system, which includes two or more ballast tanks at various longitudinal positions of the hull and, in some cases, optionally provided in structures projecting from the hull form (e.g., in one or more sponsons). The watercraft may also be equipped with other improvements, such as a modular canopy that enable the craft to be reconfigured to provide different functionality.

FIGS. 1-4 show simplified views of a variable displacement watercraft, and more specifically a variable displacement landing craft, according to the present disclosure, shown here as boat 100. The boat 100 has an outer hull 102, which has a bow 108 and a stern 104, shown here as a transom stern that terminates at transom 110. One or more propulsors (e.g., a shaft-driven propeller, a waterjet, or any other type of propulsor and/or combinations thereof) may be operatively located at the transom 110 to provide propulsive force or thrust. The outer hull 102 may include a lower hull portion (or simply hull) 106 and in some embodiments, optionally, an upper hull portion (or simply superstructure) 122.

In the illustrated example, the hull 106 has a v-shaped bottom 101 (see e.g., FIG. 7), which may improve the stability of the boat 100, for example when operating the boat 100 as a planing craft, especially in rough water. The v-shaped bottom 101 portion of the hull 102 may be defined by generally flat or curved surfaces extending from the bottom or keel line 111 to chine 113, which may allow the vessel 100 to be fast and maneuverable on the water, particularly when operated as a planing craft. In some embodiments, the bottom portion 101 of the hull 102 may be equipped with strakes or other suitable structures, such as to enhance the lift and/or stability of the vessel while in planing mode. While the lower hull 106 is shown here for simplicity of illustration as a single-chine hull, in some embodiments, the lower hull 106 may be a multi-chine hull or a round bottom hull. Furthermore, the hull 102 can comprise multiple longitudinal hull portions, such as to provide a catamaran or any multi hull configuration. The superstructure 122 may include walls having exterior surfaces inclined towards the centerline of the boat 100. The superstructure 122 may include any outer hull surfaces that extend above the weather deck of the boat 100. In some embodiments, the superstructure 122 may substantially enclose the deck of the boat 100. In some embodiments, the hull 106 and the superstructure 122, and more specifically the outer surfaces of the hull 106 and superstructure 122, may meet at and be joined at the sheer line 115. In other embodiments, the outer surfaces of the superstructure 122 may be offset inboard from the hull 102 such that there is a walking path defined between the superstructure 122 and the outboard sides of the hull, which may in some embodiments be continuous with a fore deck and/or and aft deck of the boat 100. The boat's hull 102 may be substantially symmetric about the boat's centerline $C_L$. The boat's hull 102 may define an interior cavity that encloses the various functional areas of the boat 100 such as the engine room 112, the cargo bay 116, and the control area or bridge 114. The engine room 112, which houses at least a part of the boat's propulsion system is shown located near the stern 104 of the boat 100, while the control area (or bridge) 114 is shown located near the bow 108 of the boat 100. The engine room may include, but is not limited to, an engine compartment, machinery compartment, propulsion compartment, waterjet compartment, and the like. While illustrated as primarily below deck in FIG. 1, one or more of the various functional areas (e.g., cargo bay 116, the bridge 114, or other functional areas) may extend into the superstructure 122.

The boat 100 may include a cargo (or payload) compartment, shown here as cargo bay 116, and located in this example generally amidships, between the bridge 114 and the engine room 112. The cargo bay 116 may be enclosed by a canopy 118, a portion of which may form part of the superstructure 122. The canopy 118 may, but need not, extend above the sheer line 115. In some embodiments, the boat 100 may have a modular canopy system, as described in pending patent application U.S. Ser. No. 16/825,792, titled "Modular Cargo Bay Canopy", which is incorporated herein by reference in its entirety, enabling the capacity of the cargo bay 116 and/or the operational capabilities of the boat 100 to be varied as may be desired. In some such embodiments, the overall hull form of the boat 100, and specifically the outer profile of the superstructure 122, of the boat 100 may be easily changed (e.g., from a high top configuration 154 to a low top configuration 152). While both of the high and low top configurations are shown here as above sheer 115 for ease of illustration, the canopy 118 in one or more configurations (e.g., in the low top configuration) may not actually be above the sheer 115 of the boat. One or more of the functional areas of the boat (e.g., engine room 112, bridge 114, etc.) may be provided in dry compartments (also referred to as dry areas), which implies that they are designed to be substantially water tight (i.e., to substantially prevent the ingress of water when the boat is floating in water).

The interior surfaces of the hull 102 define the internal volume 103 of the boat 100, also referred to as the hull cavity 103. The boat 100 may be equipped with a ballast system 130 located within the hull cavity 103. The ballast system 130 may include a plurality of separate ballast compartments or tanks (e.g., tanks 132, 134, and 136) longitudinally distributed along the length of the boat 100. In accordance with the present disclosure, the ballast system 130 is configured to include sufficient ballast capacity and longitudinal subdivision (e.g., to provide active LCG control) to achieve up to 15%, and in some cases up to 20%, forward and aft LCG shift while still being able to ballast to an even keel or to a specific draft when the boat is operating in low freeboard mode (i.e., at the low waterline 117). Such an enhancement of the LCG control may amount to a 1.5 times, 2 times, or greater increase of the active LCG control (or the ability to actively shift the CG of a boat longitudinally) of any existing vessels of this class.

In some embodiments, the ballast system 130 may be configured to utilize substantially all of the interior volume 103 of the boat (e.g., up to or slightly above full waterline 119) that is not otherwise occupied by a functional area as ballast volume. This ballast volume may be longitudinally segmented (or subdivided) into multiple separate tanks, for example three tanks as in the present example, although in other examples a different number (fewer or greater) of tanks may be used. Each of the separate ballast tanks may be operable to be filled and emptied independently of one another thus allowing for greater control of the subdivision and longitudinal placement of ballast within the hull 102. In other words, a separate ballast tank, or compartment/portion of a ballast tank, implies the ability to selectively fill (fully or partially) that tank or portion, and thus to selectively entrap ballast at a particular longitudinal location of the boat. As such with the inclusion of at least three separate ballast tanks, and in some cases a greater number of independently operable ballast compartments, a greater amount of active LCG control (or shifting) can be achieved. The longitudinal segmentation of the ballast volume into separate tanks may, but need not, occur at discrete longitudinal stations (or section) and may, but need not, coincide with the locations of bulkheads, which can in such cases also serves as the walls of the separate tanks. In some embodiments, the separate tanks may also be selectively fluidly connected to each other to enable selectively moving ballast from one tank to another. For example, any one of the tanks 132, 134, and 136 may be connected to one or more of the other tanks.

In the illustrated example, the boat 100 includes a first (or forward) ballast compartment or tank 132, which may extend from the bow 108 to a location rearward of the bow 108 (e.g., to the bridge 114). In some embodiments, the forward ballast tank 132 may be configured to occupy substantially the full interior volume of the bow portion 109 of the hull, e.g., the portion of the hull cavity 103 from the bow 108 to the bridge 114. In other examples, the forward ballast tank 132 may be differently positioned and/or shaped such that the forward tank 132 occupies a different portion of the interior volume or hull cavity 103 near the bow. For example, the forward tank 132 may start a different longitudinal location than the bow and/or may extend to a different rearward longitudinal location, such as to a location aft of the bridge 114. The forward ballast tank 132, and any of the other ballast tanks of boat 100 may also serve as a fuel tank, and may thus be configured to contain fuel for the boat (e.g., in one or more flexible bladders so as to keep the fuel isolated from the ballast water). As such, the boat's fuel may also function as ballast and may, like the ballast water, be selectively movable between any of the tanks. As fuel is consumed, water may be drawn from the exterior into the ballast tanks (e.g., continuously and/or dynamically as may be needed) to compensate for fuel consumption and thus loss of ballast.

Figure 5:
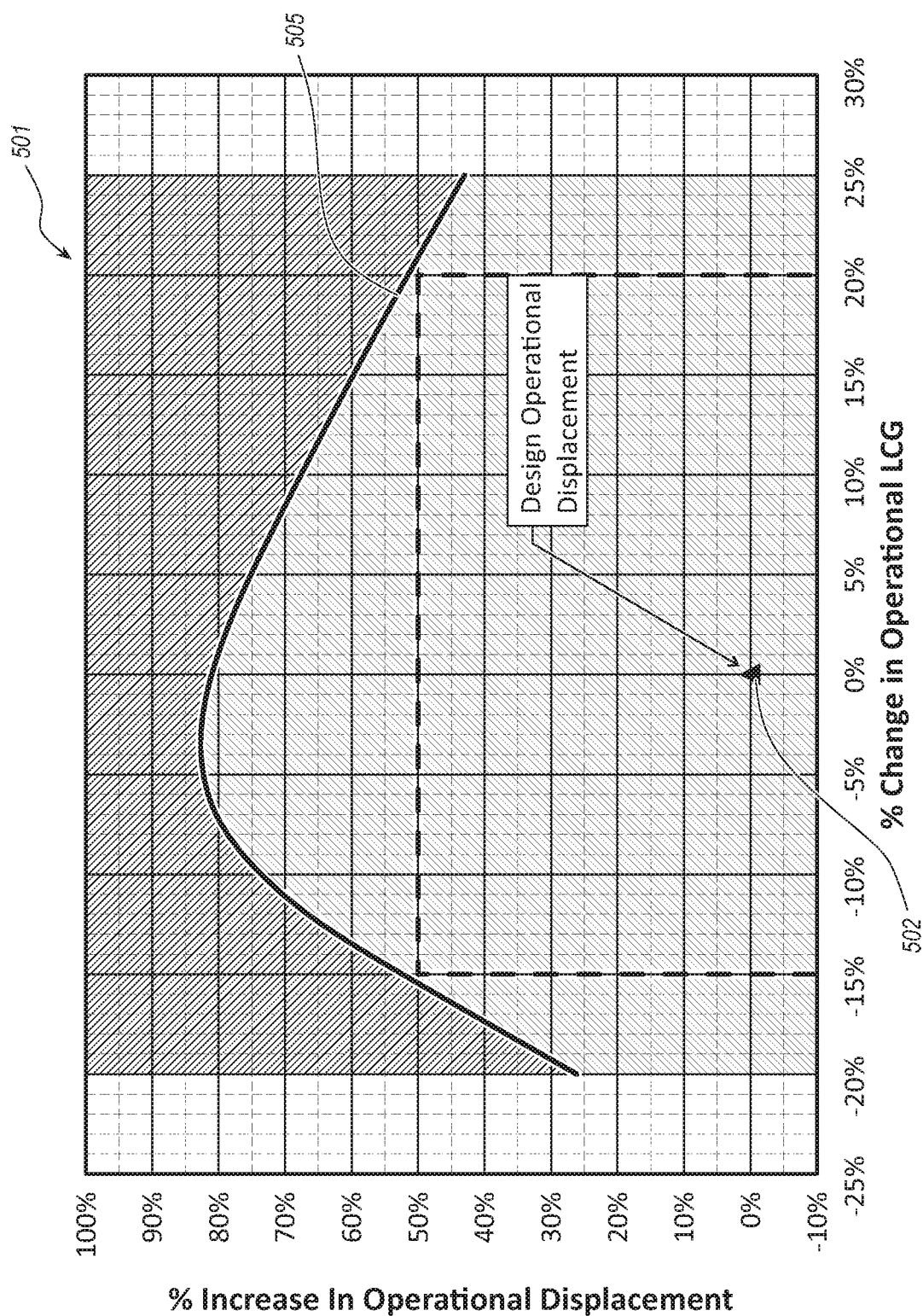
FIG. 5 is an example of enhanced variable displacement and active LCG control that may be achieved with a boat according to the present disclosure.

The boat 100 also includes second and third ballast compartments or tanks located rearward of the first ballast tank 132, shown here as a center or mid ballast tank 136 and aft ballast tank 134. One or more of the ballast tanks, for example the center tank 136 and the aft tank 134 may have complex geometries (e.g., by substantially surrounding or enclosing dry areas of the boat) for optimizing the available ballast volume. By optimizing the use of available internal volume for ballast and the segmentation thereof, a greater amount of longitudinal CG shift may be achieved, as compared to existing vessels and as shown, for example in, FIG. 5. The graph 501 in FIG. 5 plots the changes in operation displacement and LCG as percentages of the designed values. The design value of the operational displacement is displacement at full load (e.g., to include the weight of the ship, referred to as lightship, as well as the weight of any crew and/or passengers, equipment and stores, fuel and any other payload). This design value is indicated by the marker 502 in FIG. 5. Existing vessels of this class may be able to achieve up to about 20% increase in the operational displacement (e.g., by taking on additional weight, such as in the form of ballast) above the design value while tolerating up to about +/−5% of longitudinal shift of the CG of the vessel, and up to about 10% of change in the operational displacement while tolerating up to 10% change in the LCG, as indicated by the boundary line 503. In comparison, a boat according to the present disclosure may be able to achieve a much greater increase in the operational displacement while tolerating greater LCG shifts. For example, the boat 100 may be able to increase the operational displacement by about 50% while tolerating an LCG shift from about −15% to about +20% while still being able to trim at a specific draft or even keel in low freeboard mode. This may be achieved by providing a ballast system 130 with sufficient ballast capacity (e.g., one that optimizes the use of the internal volume 103) while being configured with sufficient segmentation or subdivision to achieve more precise and greater control of the longitudinal shift of the CG.

Figure 2:
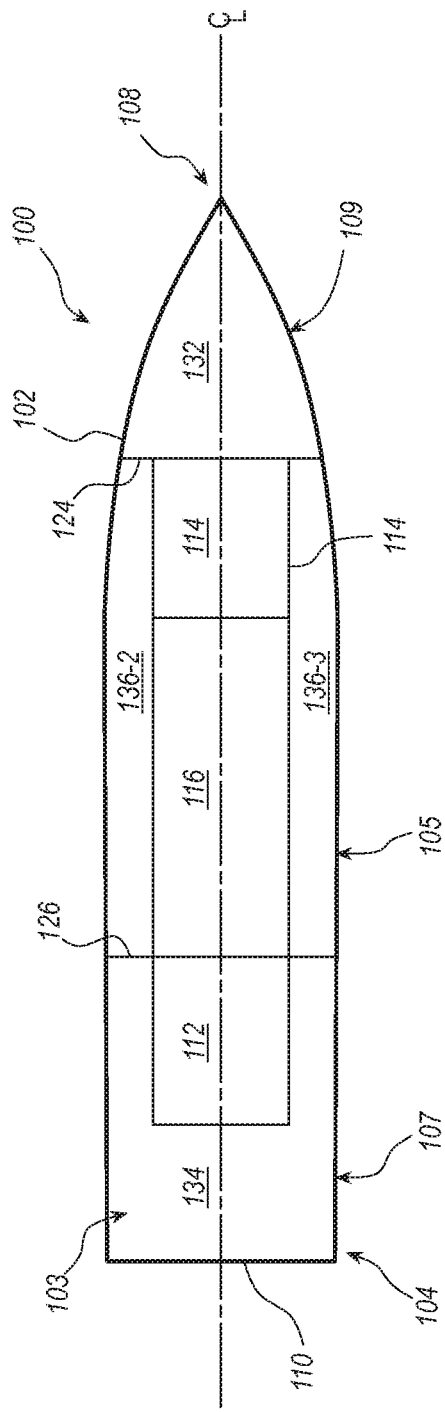
FIG. 2 is a simplified top or plan view of the boat in FIG. 1.

Referring back to the specific example in FIGS. 1 and 2, the aft ballast tank 134 is shown as located primarily in the stern portion 107 of the boat 100. In some embodiments, the aft ballast tank 134 may extend from the transom 110 substantially up to the engine room 112. In other examples, the aft tank 134 may extend along a portion of the length (e.g., under, over, and/or along the port or starboard side of) of the engine room, as shown in FIG. 1, and in some cases forward of the engine room. In this example, the center tank 136 is located between the forward and aft tanks 132 and 134, respectively and is shown here as spanning generally the midship portion of the hull 102. Like the forward tank 132, the aft tank 134 may occupy substantially the full stern portion 107 of the hull which is not otherwise occupied by a functional area (e.g., the engine room 112). The center tank 136 may occupy substantially the full internal volume of the midship portion 105 of the hull 102 that is not otherwise occupied by a functional area (e.g., the carbo bay 116 and/or bridge 114). For example, the center tank may occupy substantially the full internal volume or hull cavity 103 aft of the forward tank bulkhead 124 to the rear bulkhead 126 that is not otherwise occupied by the bridge and/or cargo bay. As such, the center tank 136 may include a first portion 136-1 that extends below the enclosed decks of the bridge and cargo bay, as well as side portions 136-2 and 136-3 that extend along the port and starboard sides of the vessel, respectively. As such, the center tank 136 may substantially surround one or more dry areas of the boat, in this case the bridge 114 and the cargo bay 116, on three sides. In some examples, one or more of the tanks (e.g., the center tank 136) may extend vertically up to and is some cases above the sheer line 115 which may enable submersion of the boat 100 to a freeboard configuration, in which the waterline is at or above the sheer line 115. By selectively filling and emptying the ballast tanks 132, 134, and 136, the boat 100 may be reconfigured between a high freeboard configuration or operational mode (e.g. as a planing craft) and a low freeboard configuration or operational mode (e.g., a semi-submerged operation). As described, one or more of the ballast tanks, for example the center tank 136 and the aft tank 134 may have complex geometries to optimize the available volume for ballast, which may enhance the active LCG control of the vessel.

In addition to providing enhanced LCG control, the internal ballast system 130 may also enable the boat 100 to be operated in various modes, including but not limited to a low freeboard (or semi-submerged) mode in which the boat 100 is submerged to a low freeboard configuration indicted by high waterline 119 and a high freeboard mode, as indicated by low waterline 117. In the high freeboard mode, the boat 100 may be operated as a planing craft, such as when traveling at speed in excess of Volume Froude Number 2.8, and the boat 100 may thus have a hull 102 form suitable for operation or use as a planing hull. For example, the hull 102 may include one or more chines 113, that define relatively sharp angles between otherwise streamlined portions of the hull. In some embodiments, the boat 100 may have a V-shaped lower portion of the hull 102, referred to here as V-hull, e.g., defined by substantially flat or curved surfaces extending from the keel line 111 to the chine 113. While only one chine 113 is shown in FIGS. 3 and 4, it will be understood that the hull 102 may include multiple chines between the keel and sheer of the boat 100.

As previously described, the boat 100 may be configured as a landing craft. As such, the boat 100 may be configured, as part of its normal operation, to approach a shoreline and be temporarily and intentionally grounded on the shoreline or beach, such as for unloading cargo (e.g., passengers, vehicle or other equipment). More specifically, the boat 100 is configured as a stern-to landing (or beaching) craft, which implies that the boat is capable of beaching (e.g., temporarily landing the vessel ashore and separating the vessel from the shore, under its own power, to return it to deeper water) with its stern oriented toward the beach, as shown in FIGS. 1 and 3. To that end, and in combination with the boat's enhanced LCG control, the boat's hull may be specifically configured to facilitate a stern-to landing by varying deadrise and tapering the keel to maximize how close the vessel can get to the beach. Being able to shift sufficient amount of ballast from an aft portion of the vessel forward, such as to a center tank, may facilitate re-balancing after cargo is unloaded. Also, the vessel may be capable of adjustments to its draft, through shifting of ballast, during any phase of a landing operation. For example, having a large amount of ballast volume available at the stern of the vessel enable a greater amount of longitudinal shift of the CG towards the stern, which may facilitate operation of the boat as a landing craft as further described herein. The landing craft (e.g., boat 100) may be equipped with a stern ramp 160 for unloading cargo from the stern 104 of the vessel. The stern ramp 160 may be provided by a modular ramp system, e.g., implemented in accordance with any of the examples in pending patent application U.S. Ser. No. 16/825,988, titled "Modular Ramp System for a Landing Craft", which is incorporated herein by reference in its entirety. In some embodiments, a beaching operation or landing, such as for the loading and unloading of cargo, may be accomplished without the keel of the boat 100 coming into physical contact with the shoreline. For example, the propulsion system (e.g., main propulsors(s), bow thrusters, etc.) may communicate with a dynamic positioning system of the boat 100 to enable an operator (e.g. manual or autopilot) to position and maintain the boat 100 in close proximity to, but without physical contact with, the shore such that when the ramp 160 is deployed any water depth at the ramp does not prevent the loading or unloading of cargo (e.g., a vehicle).

Figure 3:
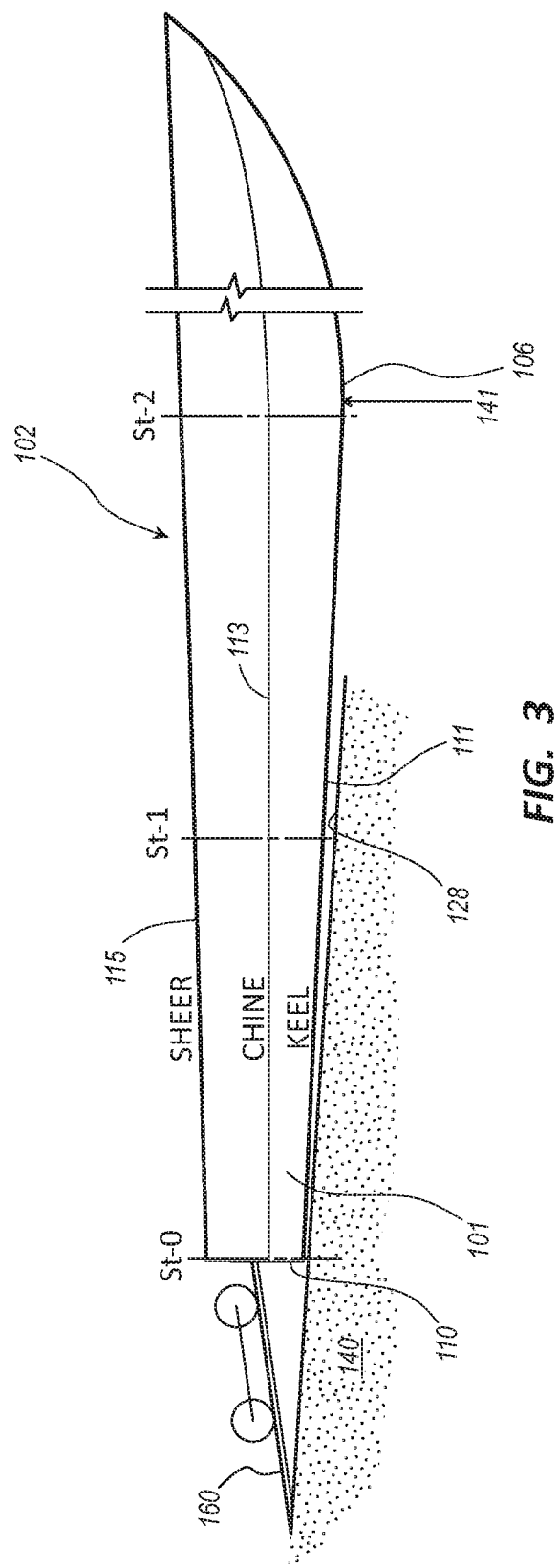
FIG. 3 is a simplified sheer plan view of the boat in FIG. 1.
Figure 4:
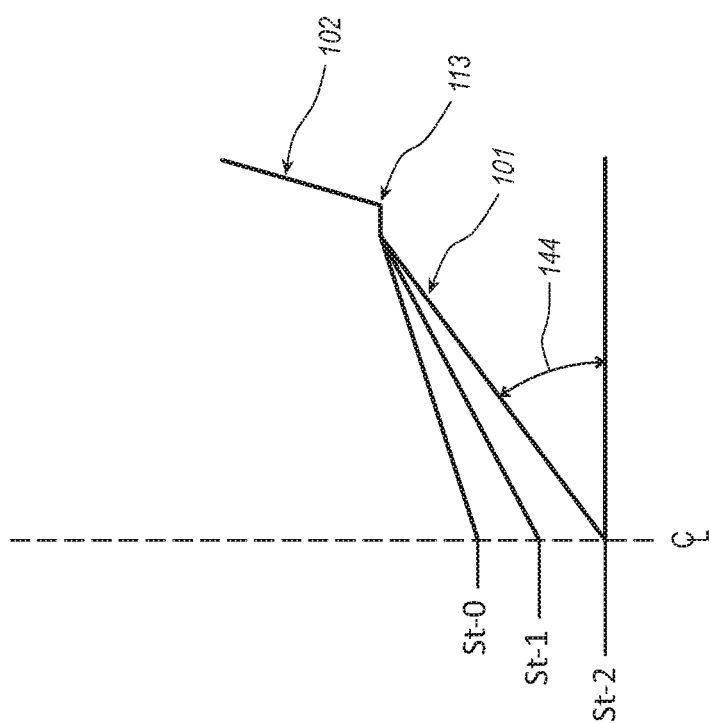
FIG. 4 is a simplified body plan view of the boat in FIG. 1.

As shown in FIGS. 1, 3, and 4, the boat 100 may have variable deadrise in at least the rear potion of the hull 102. The keel line 111 of boat 100, which is the line extending along bottom or lowest portion of the boat's hull, is inclined upward relative to the horizontal plane along the rear portion of the hull, providing a hull form with variable deadrise along the rear portion of the hull. As shown, the hull form is defined by a relatively higher deadrise at a first location (station 2, the location of which is purely illustrative) than the smaller lower deadrise at a second location aft of the first, namely the transom (indicated here as station 0). In some embodiments, the first location e.g., the location at which the deadrise begins to vary toward the stern of the vessel, may be located substantially at the stagnation line 141 of the design speed of the vessel. In other embodiments, the location at which the deadrise of the hull 102 begins to vary towards the stern of the vessel may be some other longitudinal location of the hull, e.g., forward or aft of the location of the stagnation line at design speed. In some embodiments, the location at which the deadrise of the hull 102 begins to vary towards the stern 104 of the vessel may be at about 25% of the length of the boat aft of the bow 108 of the boat 100, and thus the rear portion of the hull with variable deadrise may include up to about % of the length of the hull 102.

As shown in FIGS. 3 and 4, in some embodiments, the deadrise may decrease gradually from the first location to the second location, e.g., as indicated by intermediate location (station 1) midway between the first and second locations and showing a substantially equal amount of decrease in the deadrise from the first to the intermediate location and from the intermedia location to the second location. In other embodiments, the deadrise may vary (e.g., reduce) differently along the rear portion of the hull (e.g., between the first and second locations). In some embodiments, the deadrise distribution longitudinally fore and aft may be a linear distribution. A relatively higher deadrise forward may improve seakeeping of the boat 100 over traditional landing craft hull forms, which typically have relatively flat bottomed hull forms along substantially the full length of the hull. The relatively lower deadrise aft may provide suitable draft of the boat 100 in the stern portion of the boat 100 to facilitate the stern-to beaching capability of boat 100. By beaching with the stern 104 of the vessel, the boat 100 may have a bow portion 109 with suitable deadrise for high speed travel (e.g., in excess of Volume Froude Number 2.8), which conventional landing craft are generally incapable of.

In some embodiments the deadrise angle at the first location, which the location of transition to variable deadrise hull (e.g., as indicated by the deadrise baseline 144 in FIG. 4) may be anywhere between 13-40 degrees, and may decrease to about 10-30 degrees at the transom. In some embodiments, the chine 113 may extend substantially horizontally and the variable deadrise may be obtained by virtue of the upwardly inclining keel line, as shown in FIGS. 3 and 4. The hull 102 form of the boat may be configured to match the slope of a shoreline 128, such as a beach shoreline, which may be sloped at an angle of about 0.5-5.0. Thus, in some embodiments, the keel line 111 in the rear portion of the vessel (e.g., aft of the first location) may be upwardly inclined by an angle of about 0.5-5.0 degrees. The variable deadrise may be selected by matching the aft portion of the keel line to that of a target landing beach while maintaining a higher deadrise forward to reduce vertical accelerations when operating the boat at planing speeds in a seaway.

FIGS. 6 and 7 show simplified illustrations of additional optional features of a landing craft according to the present disclosure. The landing craft (e.g., boat 100) may be equipped with a ballastable transom sponson 138. The sponson 138 may extend from the transom 110 of the boat 100, which is shown here as being a substantially square transom 110 (e.g., extending substantially vertically), although in other embodiments, the transom 110 may be differently configured. The sponson 138 may be a prism-shaped body, formed by any suitable combination of structural members to define an internal cavity or volume 139. The internal cavity 139 is substantially watertight such that a corresponding volume of ballast 131, shown only partially filled in FIG. 7, may be contained within the cavity 139. The sponson 138 may include at least one fluid passage through a wall thereof, such that the sponson 138 may be operatively coupled to a fluid conduit of the boat's internal ballast system 130. In some embodiments, any additional ballastable volume provided by the sponson 138 may be separate from the boat's internal ballast system 130. The filling and purging of the internal volume of the sponson 138, in such embodiments, may be controlled independently or separately from the internal ballast system 130 of the boat 100. As such, the sponson 138 may be operated as an additional independent ballast tank (e.g., a fourth tank). The placement of such a ballast tank at the aft most extent of the boat may further enhance the operator's ability to control the boat's LCG with minimal impact on the overall vessel's displacement.

The sponson 138 may have geometry that substantially extends at least a portion of the stern of the vessel beyond the transom 110. In other words, the overall shape of the sponson 138 may be defined by outer surfaces including an upper surface 133, one or more lower surfaces 135 spaced apart from the upper surface 133, and side surfaces 137-1 and 137-2 connecting the upper surface 133 to the one or more lower surfaces 135. In some embodiments, the upper surface 133 of the sponson 138 may be positioned bellow the sheer line 115, as shown in FIG. 6. However in other embodiments, the sponson 138 may extend vertically up to the sheer 115, such as to increase the available ballastable volume, and the upper surface 133 may in some such embodiments be an extension of the sheer line. Similarly, the side surfaces 137-1 and 137-2 may extend the starboard and port sides of the hull 102 aft of the transom 110, and the one or more lower surfaces 135 may extend the lower portion 106 of the hull 102 aft of the transom. In some embodiments, the rear surface 141 of the sponson 138 may extend aft of any outboard portion of the propulsors 170 of the boat 100. In other embodiments, the rear surface 141 may not extend beyond the propulsors 170, for example it may terminate substantially at the aft most longitudinal location of the propulsors 170. As shown, the structure of the sponson 138 may substantially surround any outboard portion of the propulsors 170 and may thus function to protect the propulsors from damage.

As shown, as an example, in FIG. 6, a lower surface 135 of the sponson 138 is substantially aligned with and extends the lower surface of the hull (e.g., forming a substantially continuous line from the keel line 111 to the rear end of the sponson 138 along its bottom most surface). In embodiments in which the keel line is upwardly inclined, e.g., to provide variable deadrise and as shown in phantom line and indicated by keel line 111' in FIG. 6, the lower surfaces 135 of the sponson 138 may be similarly inclined so as to extend the decrease in deadrise along the rear portion of hull 102. In some embodiments, the transom sponson 138 may have a complex geometry with one or more passages defined through the length of the sponson to accommodate the outboard portion of the one or more propulsors 170 of the boat and/or the application of thrust from the stern (e.g., transom) end of the boat 100. As shown in FIG. 7, with the passages 139, a complex (e.g. having non-rectangular or other regularly shaped geometry) internal cavity is defined by the sponson 138. The inclusion of a ballastable transom sponson 138 may further enhance the active longitudinal CG control of the boat 100 by adding yet another ballastable cavity at yet another longitudinal location of the boat, which may further increase the amount of LCG shift that can be tolerated or accommodated by the boat 100.

The foregoing description has broad application. The discussion of any embodiment is meant only to be explanatory and is not intended to suggest that the scope of the disclosure, including the claims, is limited to these examples. In other words, while illustrative embodiments have been described in detail herein, the inventive concepts may be otherwise variously embodied and employed, and the appended claims are intended to be construed to include such variations, except as limited by the prior art. The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

What is claimed is:

1. A variable displacement landing craft comprising:
   a hull that extends from a bow to a stern of the landing craft, wherein the hull defines a hull cavity, and wherein a deadrise of the hull at the stern is less than a deadrise of the hull at a location forward of the stern; and
   an internal ballast system located within the hull cavity, wherein the internal ballast system comprises a plurality of ballast tanks longitudinally distributed along the hull cavity, wherein each of the plurality of ballast tanks is configured to be independently filled with or emptied of a liquid to enable selectively entrapping the liquid as ballast at a plurality of different longitudinal locations along a length of the hull to enable an intentional shifting of the longitudinal center of gravity (LCG) of the landing craft forward and aft of a design location of the LCG of the landing craft.

2. The variable displacement landing craft of claim 1, wherein the hull has a keel line that is inclined to horizontal between the stern and the location forward of the stern.

3. The variable displacement landing craft of claim 2, wherein an incline angle of the keel line is selected to substantially match a slope of a beach shoreline.

4. The variable displacement landing craft of claim 2, wherein the keel line is inclined to the horizontal by about 0.5-5.0 degrees.

5. The variable displacement landing craft of claim 1, further comprising a ramp configured to extend from the stern toward a shoreline for loading or unloading cargo onto the landing craft during a stern-to landing.

6. The variable displacement landing craft of claim 5, wherein the ramp is retractable within the hull cavity.

7. The variable displacement landing craft of claim 1, wherein the plurality of ballast tanks includes a forward ballast tank located near the bow of the landing craft, an aft ballast tank located near the stern of the landing craft, and a center ballast tank positioned between the forward ballast tank and the aft ballast tank.

8. The variable displacement landing craft of claim 7, wherein the hull comprises a transom and wherein the aft ballast tank extends substantially to the transom.

9. The variable displacement landing craft of claim 8, comprising an engine room located closer to the stern than to the bow, and wherein the aft ballast tank extends along at least a portion of a length of the engine room.

10. The variable displacement landing craft of claim 9, wherein the aft ballast tank extends to a bulkhead forward of the engine room.

11. The variable displacement landing craft of claim 9, wherein the aft ballast tank has an irregular geometry such that at least a portion of the aft ballast tank surrounds at least a portion of the engine room.

12. The variable displacement landing craft of claim 11, wherein the aft ballast tank includes respective side portions extending at least partially along the port and starboard sides of the engine room.

13. The variable displacement landing craft of claim 11, wherein the aft ballast tank substantially fills the hull cavity near the stern which is not otherwise occupied by a functional area.

14. The variable displacement landing craft of claim 9, further comprising a cargo compartment located forward of the engine room, and wherein the forward ballast tank extends substantially from the bow to a bulkhead positioned forward of the cargo compartment.

15. The variable displacement landing craft of claim 9, wherein the center ballast tank spans the longitudinal distance between a rear bulkhead positioned forward of the engine room and a forward bulkhead positioned forward of a control area of the landing craft.

16. The variable displacement landing craft of claim 7, wherein the center ballast tank is divided into a plurality of center tank portions longitudinally distributed along the hull, wherein each of the plurality of center tank portions is operable to selectively entrap water at a different longitudinal location of the center ballast tank.

17. The variable displacement landing craft of claim 1, further comprising a sponson coupled to the stern and configured to contain additional ballast fluid for additional LCG control.

18. The variable displacement landing craft of claim 17, wherein the sponson is selectively fluidly coupled to the internal ballast system for selectively moving ballast fluid between the sponson and one or more of the plurality of ballast tanks.

19. The variable displacement landing craft of claim 17, wherein at least one of:
   the sponson has a bottom exterior surface that complements a shape of the hull at the stern; and
   the sponson is configured to at least partially surround an aft end of a propulsor of the landing craft.

20. The variable displacement landing craft of claim 1, wherein the plurality of ballast tanks are longitudinally distributed to allow for 12% or greater shift of the LCG forward and aft of the design location.

21. The variable displacement landing craft of claim 20, wherein the at least three ballast tanks are longitudinally distributed to allow for up to about 20% aft and 25% forward shift of LCG from the design location.

22. The variable displacement landing craft of claim 20, wherein the at least three ballast tanks are configured to enable up to 50% increase in displacement while tolerating a shift of the LCG of up to about 20% forward and up to about 15% aft of the design location.

23. The variable displacement landing craft of claim 20, wherein the at least three ballast tanks are configured to enable up to 60% increase in displacement while tolerating a shift of the LCG of up to about 15% forward and up to about 13% aft of the design location.

24. The variable displacement landing craft of claim 20, wherein the at least three ballast tanks are configured to enable up to 70% increase in displacement while tolerating a shift of the LCG of up to about 8% forward and up to about 10% aft of the design location.

25. The variable displacement landing craft of claim 20, wherein the at least three ballast tanks are configured to enable up to 80% increase in displacement while tolerating a shift of the LCG of up to about 5% forward and up to about 9% aft of the design location.

26. The variable displacement landing craft of claim 1, wherein each of the plurality of ballast tanks are selectively fluidly connected for selectively moving ballast fluid between the ballast tanks.

* * * * *